(12) United States Patent
Borodin et al.

(10) Patent No.: US 10,331,754 B2
(45) Date of Patent: Jun. 25, 2019

(54) COMBINING WEB BROWSER AND AUDIO PLAYER FUNCTIONALITY TO FACILITATE ORGANIZATION AND CONSUMPTION OF WEB DOCUMENTS

(75) Inventors: Yevgen Borodin, Stony Brook, NY (US); Alexander Dimitriyadi, Bayside, NY (US); Yury Puzis, Port Jefferson, NY (US); Faisal Ahmed, Lake Grove, NY (US); Valentyn Melnyk, Stony Brook, NY (US)

(73) Assignee: CharmTech Labs LLC, Stony Brook, NY (US)

( * ) Notice: Subject to any disclaimer, the term of this patent is extended or adjusted under 35 U.S.C. 154(b) by 386 days.

(21) Appl. No.: 13/458,961

(22) Filed: Apr. 27, 2012

(65) Prior Publication Data

US 2012/0278082 A1 Nov. 1, 2012

Related U.S. Application Data

(60) Provisional application No. 61/480,606, filed on Apr. 29, 2011.

(51) Int. Cl.
| | |
|---|---|
| G10L 13/00 | (2006.01) |
| G06F 16/954 | (2019.01) |
| G06F 16/957 | (2019.01) |
| G10L 13/08 | (2013.01) |

(52) U.S. Cl.
CPC .......... G06F 16/954 (2019.01); G06F 16/957 (2019.01); *G10L 13/08* (2013.01)

(58) Field of Classification Search
CPC ......... G10L 13/00; G10L 13/02; G10L 13/08; G10L 2013/00; G10L 2013/02; G10L 2013/08
USPC ...................... 704/260, 258, 270, 270.1, 276
See application file for complete search history.

(56) References Cited

U.S. PATENT DOCUMENTS

| | | | |
|---|---|---|---|
| 2003/0158737 A1* | 8/2003 | Csicsatka ...................... 704/273 |
| 2006/0195521 A1* | 8/2006 | New et al. .................... 709/204 |
| 2008/0120501 A1* | 5/2008 | Jannink et al. ............... 713/163 |
| 2008/0313308 A1* | 12/2008 | Bodin et al. .................. 709/219 |
| 2010/0186038 A1* | 7/2010 | Thomas et al. ................. 725/42 |
| 2011/0202842 A1* | 8/2011 | Weatherly et al. ........... 715/716 |

* cited by examiner

*Primary Examiner* — Qi Han
(74) *Attorney, Agent, or Firm* — Madeline F. Schiesser; Keohane & D'Alessandro PLLC (57) ABSTRACT

The invention is directed to combining web browser and audio player functionality for the organization and consumption of web documents. Specifically, the invention identifies a set of web documents via a web browser, extracts content from the web documents, and adds the set of web documents to a playlist. In this way, users can build a playlist of web documents and utilize the functionality and convenience of an audio player and listen to the content of the playlist.

19 Claims, 7 Drawing Sheets

COMBINING WEB BROWSER AND AUDIO PLAYER FUNCTIONALITY TO FACILITATE ORGANIZATION AND CONSUMPTION OF WEB DOCUMENTS

CROSS REFERENCE TO RELATED APPLICATION

This application claims the benefit of U.S. Provisional Application No. 61/480,606 filed on Apr. 29, 2011.

FIELD OF THE INVENTION

The invention relates generally to the field of Information Technology (IT), and, more specifically, to systems and methods for consuming information from the World Wide Web.

BACKGROUND OF THE INVENTION

With the proliferation of web technologies, there has been an overwhelming amount of information available on the Web. Unfortunately, many people find that there is too much information and there is never enough time to process it. For many people, it is common to encounter appealing articles and documents, but have no time to read them. Current approaches enable users to add articles to a reading list for later viewing. However, compiling a reading list does not mean that the users will have the time to read it visually.

SUMMARY OF THE INVENTION

In general, embodiments of the invention provide approaches for combining web browser and audio player functionality for the organization of web documents, audio and/or visual consumption of web documents, and synchronization of the browsing state of those documents between computer devices. Embodiments of the invention allow users to add textual web documents to a playlist, convert the text to an audio rendition, and then play the web documents via an audio playback device. As such, users can compile a playlist of web documents and then listen to them with the functionality and convenience of an audio player.

One aspect of the present invention includes a method for combining web browser and audio player functionality for organization and consumption of web documents, comprising the computer implemented steps of: identifying a set of web documents from a web browser; and adding the set of web documents to a playlist.

Another aspect of the present invention provides a system for combining web browser and audio player functionality for organization and consumption of web documents, comprising: a memory medium comprising instructions; a bus coupled to the memory medium; and a processor coupled to the bus that when executing the instructions causes the system to: identify a set of web documents via a web browser; and add the set of web documents to a playlist.

Another aspect of the present invention provides a computer-readable storage medium storing computer instructions, which when executed, enables a computer system to combine web browser and audio player functionality for organization and consumption of web documents, the computer instructions comprising: identifying a set of web documents via a web browser; and adding the set of web documents to a playlist.

Another aspect of the present invention provides a computer implemented method for combining web browser and audio player functionality for organization and consumption of web documents, comprising: providing a computer infrastructure being operable to: identify a set of web documents via a web browser; and add the set of web documents to a playlist.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements, which are referred to from the description of the invention.

DETAILED DESCRIPTION OF THE INVENTION

Exemplary embodiments now will be described more fully herein with reference to the accompanying drawings, in which exemplary embodiments are shown. Embodiments of the invention combine web browser and audio player functionality for the organization and consumption of web documents. Specifically, the invention comprises a web document player for identifying a set (i.e., one or more) of web documents via a web browser, and adding the set of web documents to a playlist. In this way, users can build a playlist of web documents and listen to them with the functionality and convenience of an audio player.

This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus appearances of the phrases "in one embodiment," "in an embodiment," "in embodiments" and similar language throughout this specification may, but do not necessarily, all refer to the same embodiment.

To better understand the embodiments of the invention, the present description will operate in the following terms. The World Wide Web, or simply the Web or Web, is a system of interlinked web documents that can be accessed via the Internet with the help of a web browser. A Web Browser is an application for retrieving, presenting, and traversing information and other resourced from the World Wide Web or other information sources. A web browser can be realized through software, hardware, or a combination of software/hardware. A Web Document is any document available on the Web. As used herein, a web document can represent an e-mail, a web page, or a file accessible via the web (e.g., Microsoft® Word document, a PDF file, etc.) Web documents can be "consumed" (i.e., received and processed) by people via their senses: such as hearing, sight, touch, etc. Thus, the consumption of documents will refer to the use of the senses to read, listen, view or otherwise experience web document content.

An Audio Player is an application that enables playing of audio tracks, through an audio output device (e.g., speakers). An audio player can be realized through hardware, software, or a combination of the two. Tracks are typically compiled and organized in a Playlist, which can have zero or more tracks. Each track typically has the audio and metadata description of the audio, e.g., track title, author, current position, playlist association, etc. Furthermore, an audio player can have multiple playlists, and a single track can belong to multiple playlists.

Speech Synthesis refers to the conversion of textual content into speech. A speech synthesizer is a system for speech synthesis that can be realized through software, hardware, or a combination of hardware/software. An application capable of narrating a collection of textual documents via speech synthesis may comprise an audio player, while the collection of textual web documents in that application can be perceived as a playlist that can be played with the audio player via speech synthesis.

Figure 1:
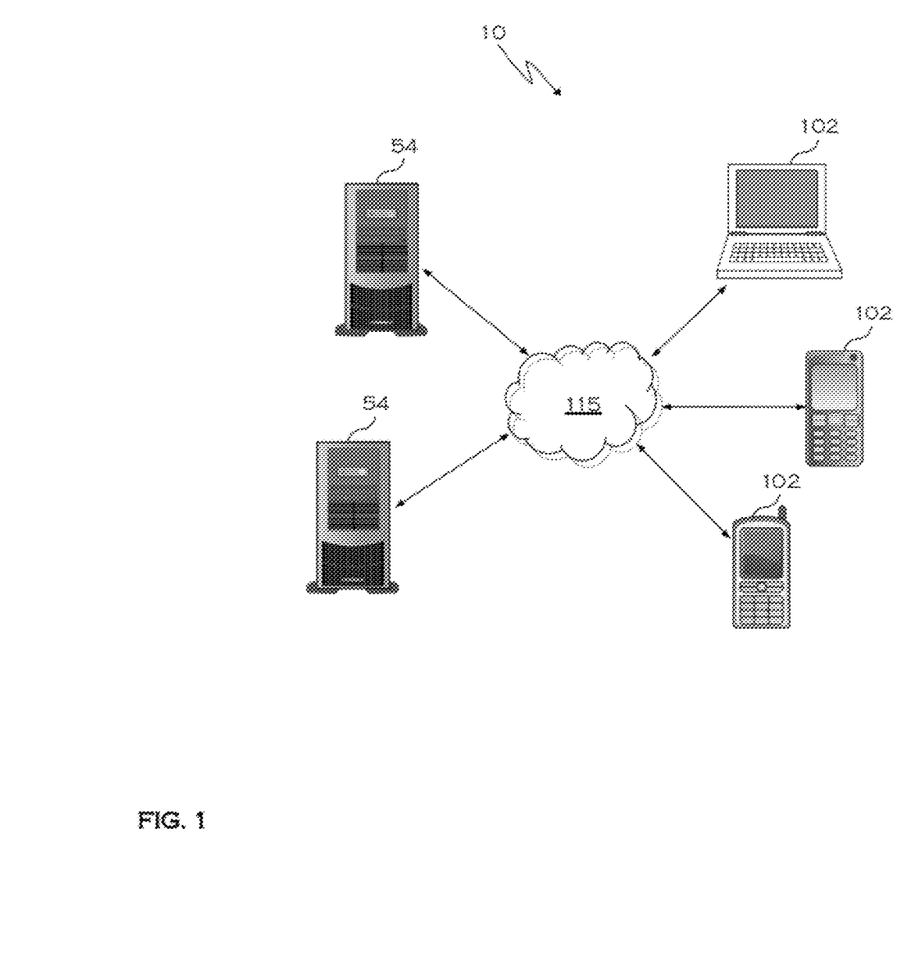
FIG. 1 shows a pictorial representation of a network of data processing systems in which aspects of the illustrative embodiments may be implemented.

With reference now to the figures, FIG. 1 shows a pictorial representation of a network of data processing system 10 in which aspects of the illustrative embodiments may be implemented. Network data processing system 10 is a network of computers (e.g., mobile devices 102 and servers 54) in which embodiments may be implemented. Network data processing system 10 contains network 115, which is the medium used to provide communications links between various mobile devices 102, servers 54, and other computers connected together within network data processing system 10. For instance, the devices can use network 115 to synchronize playlist data. Network 115 may include connections, such as wire, wireless communication links, fiber optic cables, etc. It should be noted that exemplary embodiments of the invention are described in the context of a mobile computing device 102 (e.g., mobile telephone, laptop computer, tablet computer, e-reader, etc.). However, it will be appreciated that the invention is not limited by this description, and may encompass any number of computing infrastructures, architectures, and devices.

In the example depicted in FIG. 1, servers 54 and a set of mobile devices 102 connect to network 115. In the depicted example, servers 54 provide data, such as boot files, operating system images, and applications to mobile devices 102. Mobile devices 102 are clients to servers 54 in this example. Network data processing system 10 may include additional servers, clients, and other devices not shown.

In the exemplary embodiment, network data processing system 10 is the Internet with network 115 representing a worldwide collection of networks and gateways that use the Transmission Control Protocol/Internet Protocol (TCP/IP) suite of protocols to communicate with one another. At the heart of the Internet is a system of high-speed data communication lines between major nodes or host computers, consisting of thousands of commercial, governmental, educational, and other computer systems that route data and messages. It is understood that network data processing system 10 also may be implemented as a number of different types of networks, such as for example, an intranet, a local area network (LAN), or a wide area network (WAN). Network data processing system 10 represents one environment in which one or more web documents operate with mobile devices 102, as will be described in further detail below. It will be appreciated that FIG. 1 is intended as an example, and not as an architectural limitation for different embodiments.

Figure 2:
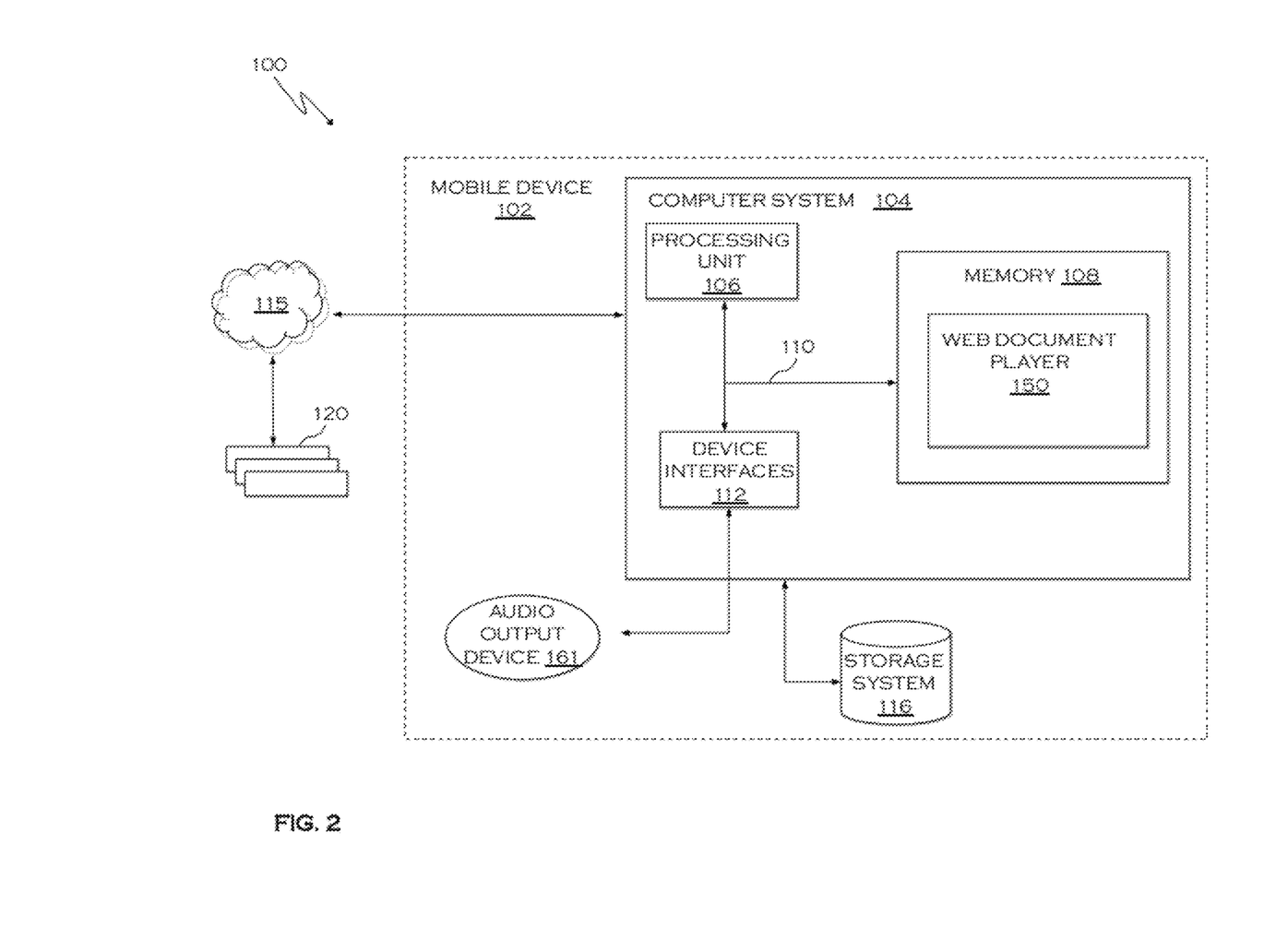
FIG. 2 shows a schematic of an exemplary computing environment in which elements of the present invention may operate.

Turning now to FIG. 2, a computerized implementation 100 of the present invention will be described in greater detail. As depicted, computerized implementation 100 includes computer system 104 deployed within a mobile device 102 (e.g., computer infrastructure). This is intended to demonstrate, among other things, that the present invention could be implemented within network environment 115 (e.g., the Internet, a wide area network (WAN), a local area network (LAN), a virtual private network (VPN), etc.), or on a stand-alone computer system. Still yet, the computer infrastructure of mobile device 102 is intended to demonstrate that some or all of the components of computerized implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for combining web browser and audio player functionality for organization and consumption of web documents. It should be understood that any other computers implemented under the present invention may have different components/software, but will perform similar functions. As shown, computer system 104 includes a processing unit 106 capable of operating with a web document player 150 stored in a memory unit 108 to combine web browser and audio player functionality for organization and consumption of web documents, as will be described in further detail below. Also shown are device interfaces 112 allowing the computer system to connect to other devices, e.g., audio output device 161. Also shown is a bus 110 connecting various components of computer system 104, Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes data from a set of web documents 120 (e.g., emails, web pages, word processing documents, data files, etc.) to web document player 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating web document player 150, which is stored in memory 108 and/or storage system 116. While executing computer program code, processing unit 106 can read and/or write data to/from memory 108 and storage system 116. Storage system 116 can include VCRs, DVRs, RAID arrays, USB hard drives, optical disk recorders, flash storage devices, and/or any other data processing and storage elements for storing and/or processing data. Although not shown, computer system 104 could also include I/O interfaces that enable a user to interact with computer system 104 (e.g., keyboard, display, camera, touchpad, microphone, pointing device, speakers, etc.).

Figure 3:
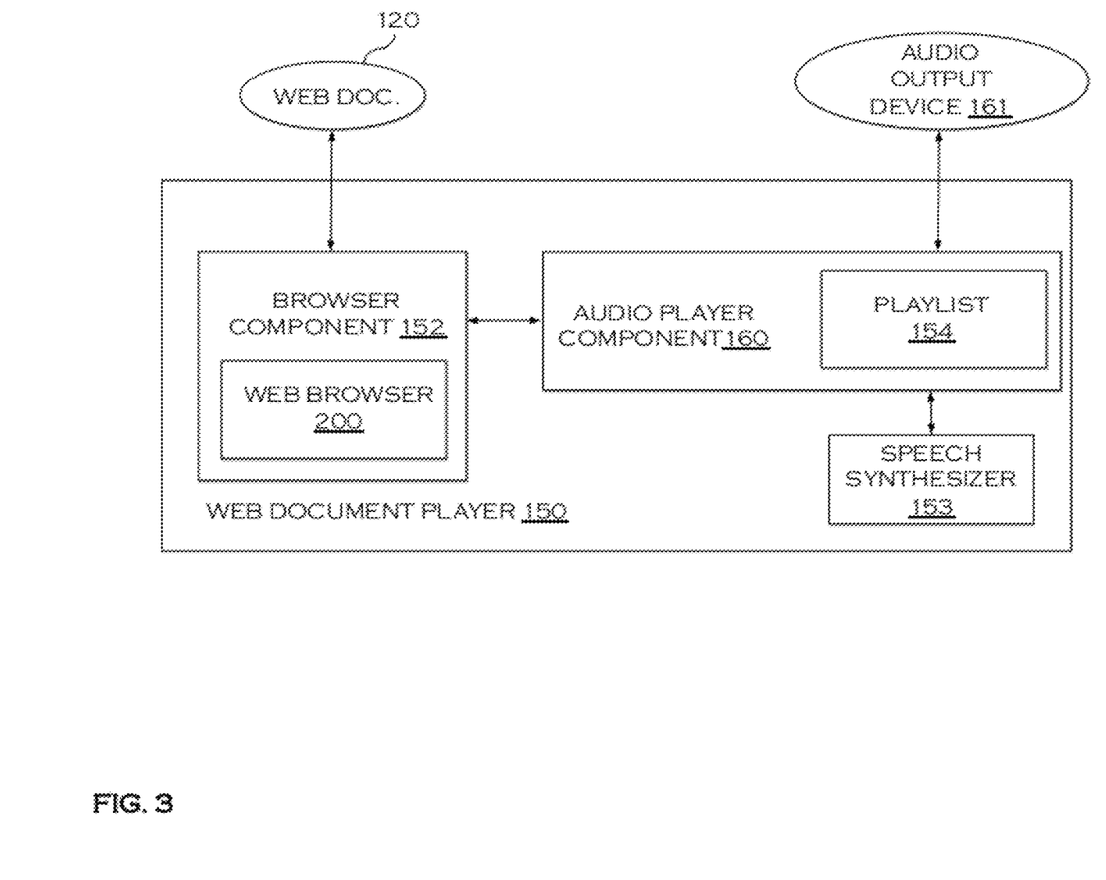
FIG. 3 shows a mobile device that operates in the environment shown in FIG. 1.

Turning now to FIG. 3, the structure and operation of web document player 150 according to embodiments of the invention will be described in greater detail. As noted above, web document player 150 combines web browser and audio player functionality for organization and consumption of web documents 120. To accomplish this, web document player 150 comprises a browser component 152 configured to receive and render web content, including web documents 120. During operation, web documents 120 are received at web document player 150, which, in one embodiment, may be a thick-client wrapper (e.g., software code, program module(s), application program(s), etc.) running natively on mobile device 102. Depending on the platform/device, web document player 150 could be developed in C#.NET or Visual Basic (VB).net for Windows® mobile devices, Objective C for iOS devices, and Java® for Android™ devices. (Visual Basic® and WINDOWS® are registered trademarks of Microsoft Corporation, Objective C is a registered trademark of Apple Computer, Inc., JavaScript® is a registered trademark of ORACLE AMERICA, INC., and Android™ is a registered trademark of the Google Corporation). It will be appreciated if the listed languages and devices were not limiting the implementation for different embodiments of the invention.

Web document player 150 operates with browser component 152, which, with the help of web browser 200 enables mobile device users to, among other things, open/load web pages and other web documents; interact with web pages and web documents, e.g., read, scroll, pan, zoom, follow links, etc.; perform other typical web browser interactions (e.g., enter a URL, use bookmarks, etc.). Furthermore, browser component 152 is capable of sending one or more web documents 120 to an audio player component 160 to be added to a playlist. This may be performed automatically by browser component 152 by extracting a portion of text from one or more web documents 120, or manually, by the user. In the case of manual selection, browser component 152 enables the user to select text (i.e., a portion or the entire amount) from the web documents 120 by: selecting menu items, clicking control buttons, saying commands, drag-and-dropping content, gesturing, pressing-and-holding a link to extract the content from the linked web page, or performing other interactions with the user's device and/or the web browser.

As further shown, web document player 150 comprises a speech synthesizer 153 configured to convert at least a portion of text from the web documents 120 to audio that can be played by audio player component 160. During operation, a typical speech synthesizer 153 assigns phonetic transcriptions to each word, and divides and marks the text into prosodic units, like phrases, clauses, sentences, etc. Next, it converts the symbolic linguistic representation into sound, including pitch contour, phoneme durations, etc. It will be appreciated that speech synthesizer can use other processes to converting text to speech. Furthermore, Although speech synthesizer 153 is shown as a separate component within web document player 150, it will be appreciated that speech synthesizer 153 may be also be a sub component of audio player component 160 and/or browser component 152.

Web document player 150 further comprises audio player component 160 configured to receive the set of web documents 120 and add it to one or more playlists. In one embodiment, audio player component 160 enables selection of at least one of the set of web documents 120 added to the playlist 154, followed by the output of an audio rendition of the web document with audio player component 160. In another embodiment, selection of one or more web documents 120 enables the user to load/open the web document in a web browser for visual consumption. Among other things, audio player component 160 allows users to: play, scroll, move, remove, group, save, load, and otherwise interact with and organize playlist tracks; view and interact with the content of a playlist track (e.g., view the original content associated with a playlist track, print that content, copy content, etc.); control playback of the playlist tracks (e.g., scroll, navigate, rewind, change rate, change voices, skim, etc.), open/load the web page or document associated with the playlist track; and synchronize the playlist with server 54 (FIG. 1) or with other instances of the audio device.

Figure 4:
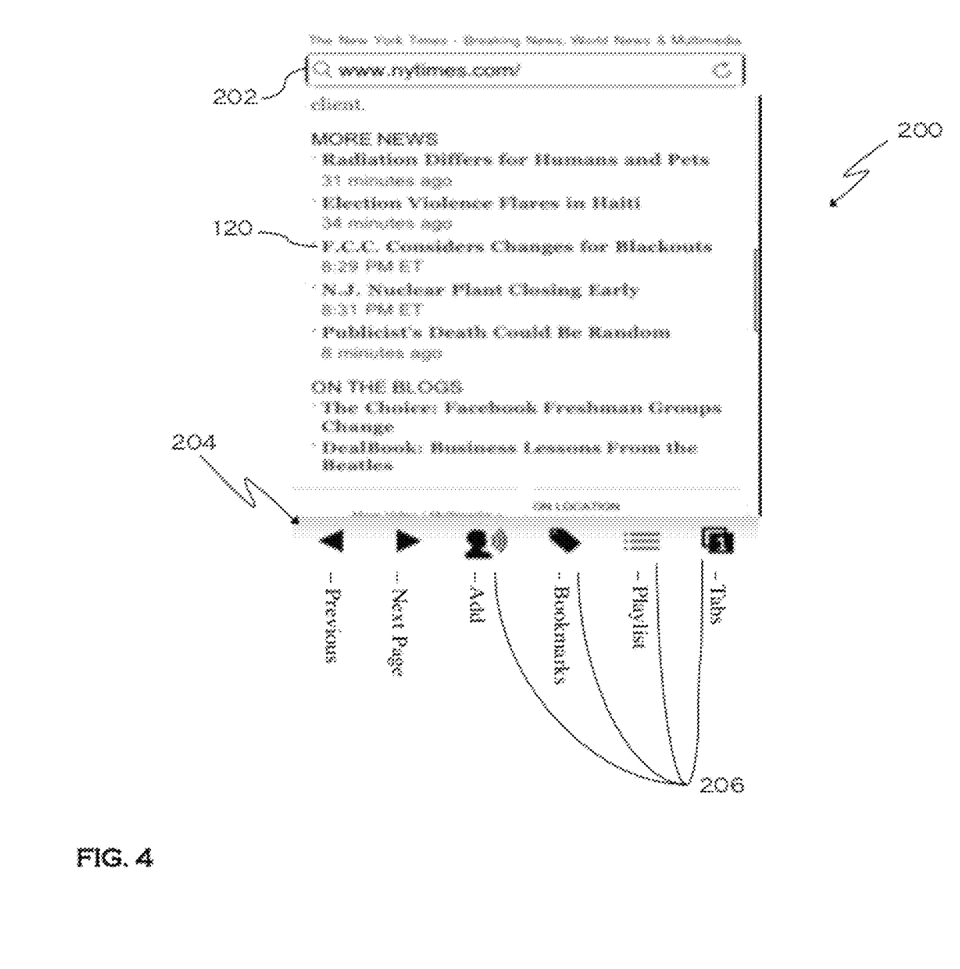
FIG. 4 illustrates an exemplary web browser and webpage (web document) containing a plurality links to other web documents.

Turning to FIG. 4, a non-limiting implementation of a web browser 200 will be shown and described in greater detail. In this embodiment, browser component 152 renders a web document 120 with the help of a web browser 200. In general, web browser 200 is a browser embedded into an application to enable users to view Web content from within that application. As shown, web browser 200 comprises a URL bar 202 at the top of the screen, and a menu 204 with control buttons 206 (e.g. previous page, next page, add-to-playlist, bookmark, switch to playlist, tabs) at the bottom. Browser component 152 controls web browser 200, extracts content from the browser, and determines, e.g., the way web browser 200 displays web documents, dialogs, softkeys, scroll bars, and so on.

Web browser 200 can render web pages in Hypertext Markup Language (HTML), JavaScript®, Asynchronous JavaScript® and XML (AJAX), Extended Hypertext Markup Language (XHTML), Wireless Markup Language (WML), and so on. Web browser 200 enables display of XHTML, HTML, WML, CSS, or scripted content inside an application. In one embodiment, web browser 200 operates with an action servlet (e.g., a web standard Struts/Struts II for building front ends to Java® applications) to serve up more sophisticated web pages. During operation, the action servlet receives an HTTP request, uses the Struts configuration files to determine the appropriate application module, and routes the request to the module's request processor.

Figure 5:
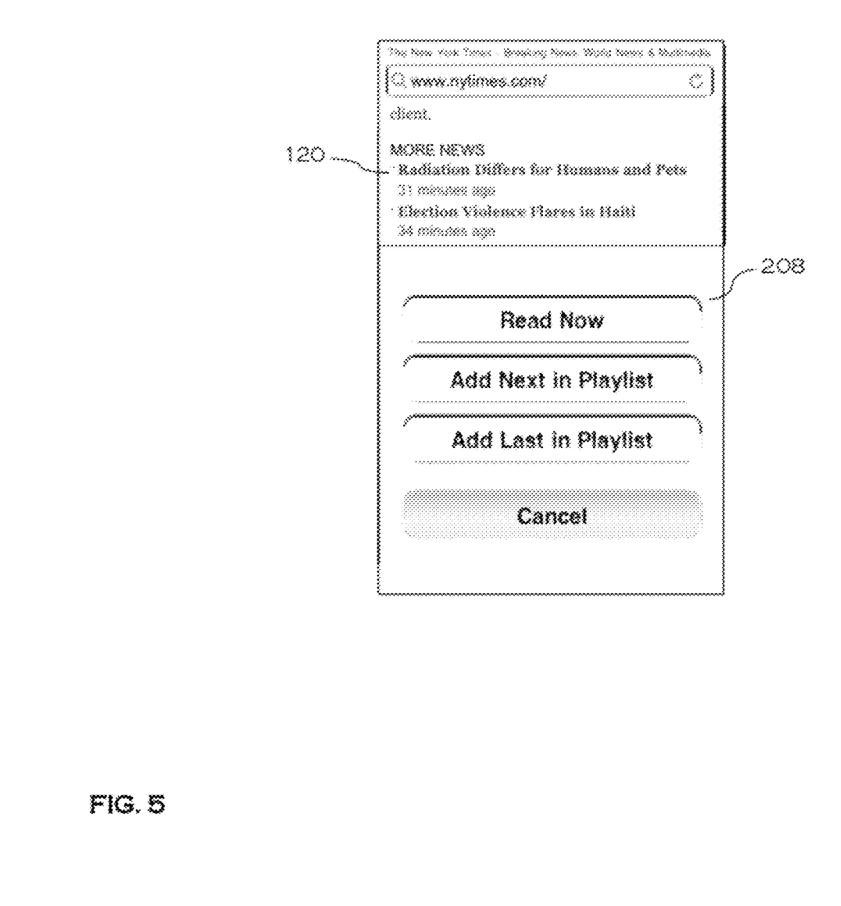
FIG. 5 illustrates an exemplary implementation of an approach for adding content to a playlist.

FIG. 5 shows a non-limiting exemplary implementation of a menu 208 for adding web document(s) 120 (e.g., web pages) to a playlist using command buttons (e.g., "Read Now," "add Next in Playlist," "add Last in Playlist," or "Cancel"). In one embodiment, menu 208 opens when the "add" button 206 (FIG. 4) is selected by the user. Content can also be added to the playlist in any number of ways, some of which are described above.

Figure 6:
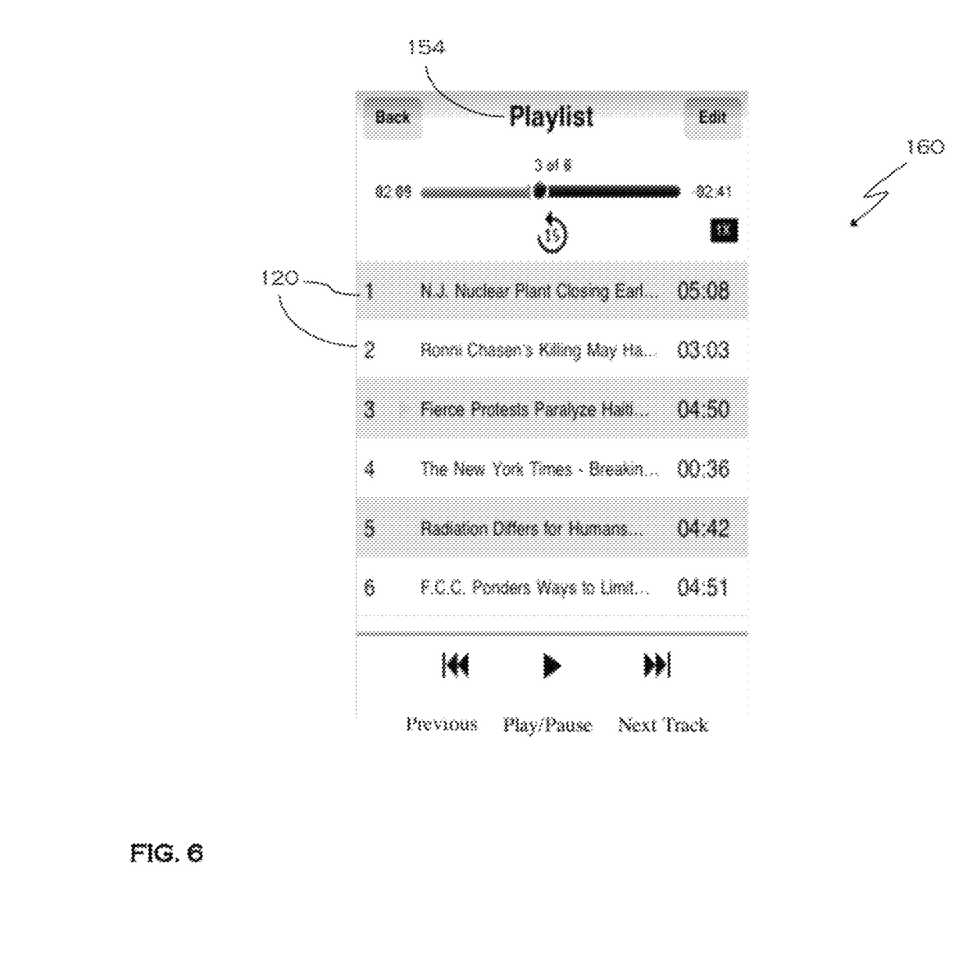
FIG. 6 illustrates an exemplary playlist having various audio player controls.

FIG. 6 shows a non-limiting exemplary implementation of audio player component 160 with comprising a playlist 154 generated by audio player component 160. As shown, audio player 160 comprises various typical audio player controls to, e.g., scroll, rewind 15 seconds, and change the speech rate at the top of the screen, rewind/previous track, play/pause, and fast forward/next track. In one embodiment, selecting the "playlist" button 206 (FIG. 4) opens playlist 154 on mobile device 102 of the user. During use, audio player component 160 processes web documents 120, and adds them to playlist 154, which is operable with speech synthesizer 153 and audio output device 161. Selection of a web document 120 in playlist 154 causes audio player component 160 to play an audio rendition (e.g., synthesized speech) of the web document 120. Selection of one or more web documents 120 enables the user to load/open the selected web document in web browser 200 (FIG. 4) for visual consumption as well. As such, the invention enables seamless switching between web browser 200 and audio player component 160 to improve organization and consumption of web documents 120 for a user. Addition of web documents 120 to the playlist 154 enables the user to capture the current browsing state in the browser component 152 and continue consuming the web documents through the audio player component 160.

Furthermore, in another embodiment, playlist 154 is capable of operating on a plurality of different devices, as it is common today for users to simultaneously operate more than one computerized device (e.g., cell phone, tablet computer, laptop computer, PDA, etc.) To accommodate this, web document player 150 and audio player component 160 are configured to synchronize web documents 120 of playlist 154, including the current state of each of the web documents 120, with other playlists associated with the user that may exist on one or more additional devices.

It can be appreciated that the approaches disclosed herein can be used within a computer system to provide interoperability between hardware functions and web documents, as shown in FIG. 2. In this case, web document player 150 can be provided, and one or more systems for performing the processes described in the invention can be obtained and deployed to mobile device 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 7:
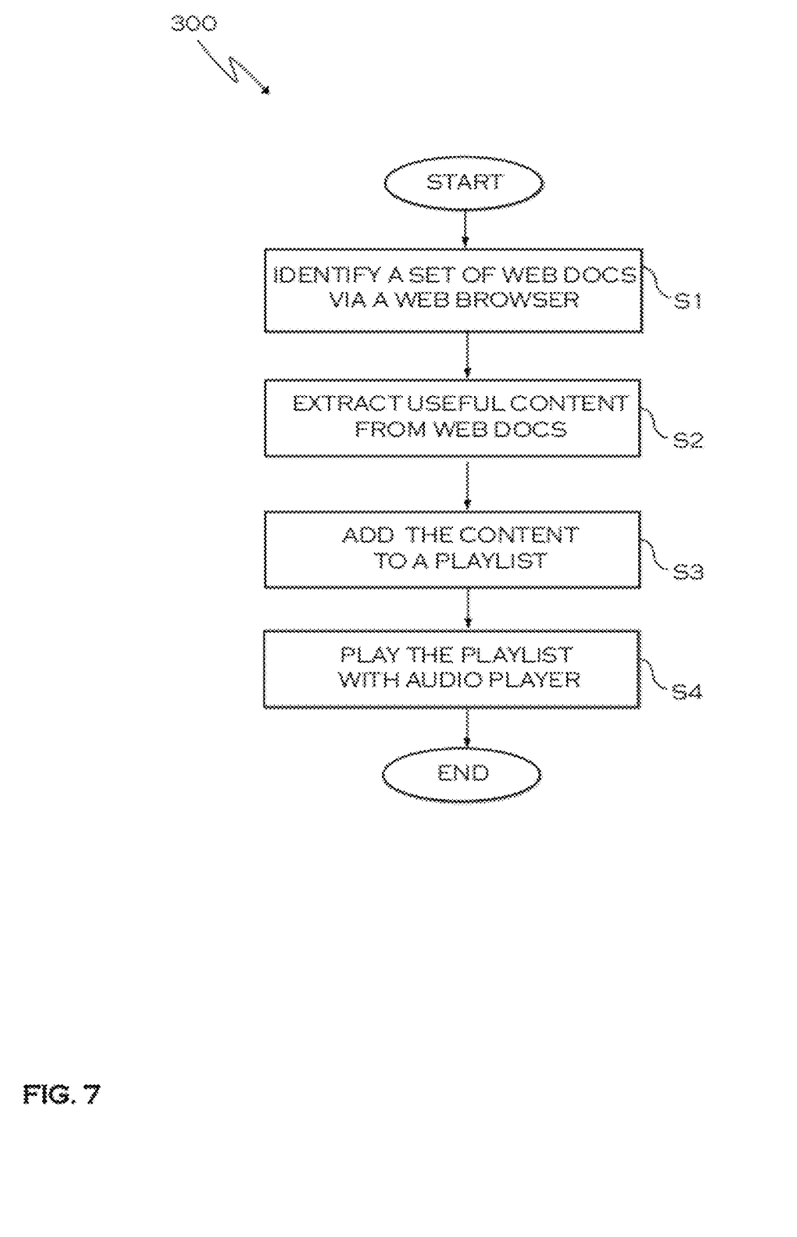
FIG. 7 shows a flow diagram of an approach for combining web browser and audio player functionality for the organization and consumption of web documents according to embodiments of the invention.

Computer system 104 carries out the methodologies disclosed herein, as shown in FIG. 7. Shown is a method 300 for combining web browser and audio player functionality for organization and consumption of web documents. To accomplish this, at S1, a set of web documents is identified via a web browser. Next, at S2, useful content is extracted from web documents based on the user selection of content or based on an algorithm capable of identifying useful content. At S3, the extracted content is added to a playlist, and, finally, at S4, the playlist is played by the audio player, e.g., using speech synthesis, and the process ends.

The flowchart of FIG. 7 illustrates the architecture, functionality, and operation of possible implementations of systems, methods and computer program products according to various embodiments of the present invention. In this regard, each block in the flowcharts may represent a module, segment, or portion of code, which comprises one or more executable instructions for implementing the specified logical function(s). It should also be noted that, in some alternative implementations, the functions noted in the blocks might occur out of the order noted in the figures. For example, although useful content extraction from the web documents is shown as being done prior to being added to the playlist, it may also be possible that content extraction occurs after being added to the playlist. Furthermore, the process does not need to start at S1 and end at S4, e.g., S1 through S3 can be executed in one session and end at S3, S4 can be executed in another session. Additionally, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Many of the functional units described in this specification have been labeled as modules in order to more particularly emphasize their implementation independence. For example, a module may be implemented as a hardware circuit comprising custom VLSI (Very-Large-Scale Integration) circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

For example, an implementation of exemplary computer system 104 (FIG. 1) may be stored on or transmitted across some form of computer readable storage medium. Computer readable storage medium can be any available media that can be accessed by a computer. By way of example, and not limitation, computer readable storage medium may comprise "computer storage media" and "communications media."

"Computer-readable storage medium" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is apparent that there has been provided an approach for providing interoperability between hardware functions and web documents. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for combining web browser and audio player functionality for organization and consumption of web documents, the method comprising the computer implemented steps of:
    identifying a set of textual web documents via a web document player application that displays textual content of a web document, wherein the web document player application comprises a web browser for rendering the web document and an audio player component having a subcomponent configured to narrate a collection of textual documents via speech synthesis;
    capturing a current browsing state of at least one web document of the set of web documents;
    saving the textual content and the current browsing state of the at least one web document of the set of web documents to a playlist on a device as a text track in the web document player, the playlist having a plurality of text tracks, each text track of the plurality of text tracks having a title and the textual content;
    displaying, in response to a selection by a user to view the textual content, the textual content of the text track in the web document player;
    narrating, in response to a selection by the user to hear the textual content, the textual content of the text track in the playlist from the saved browsing state as synthesized speech by the audio player component of the web document player application, enabling seamless switching between the web browser and the audio player component, and synthesizing speech from the textual content in response to the selection; and
    synchronizing a current state of the text track with another device.

2. The method according to claim 1, further comprising the computer implemented steps of synthesizing speech from at least a portion of the textual content of the text track by:
    assigning a phonetic transcription to each word of the textual content;
    dividing the textual content into prosodic units and marking the textual content with symbolic linguistic representations of the textual content; and
    converting the symbolic linguistic representation into sound.

3. The method according to 1, the identifying comprising the computer implemented step of enabling selection, by a user, of a portion of text from the set of web documents.

4. The method according to claim 1, the identifying comprising the computer implemented step of automatically extracting a portion of useful text from the set of web documents.

5. The method according to claim 1, the saving comprising the computer implemented step of saving each of the set of web documents as a text track to one or more audio playlists operable via the audio player component.

6. The method according to claim 1, further comprising the computer implemented step of displaying textual content of at least one web document text track as the audio player component narrates the textual content of the web document text track.

7. The method according to claim 1, further comprising the computer implemented step of synchronizing a state of the textual content of a text track of the playlist on a device with a plurality of devices.

8. A system for combining web browser and audio player functionality for organization and consumption of web documents, the system comprising:
   a memory medium comprising instructions;
   a bus coupled to the memory medium; and
   a processor coupled to the bus that when executing the instructions causes the system to:
   identify a set of textual web documents via a web document player application that displays textual content of a web document, wherein the web document player application comprises a web browser for rendering the web document and an audio player component having a subcomponent configured to narrate a collection of textual documents via speech synthesis;
   capture a current browsing state of at least one web document of the set of web documents;
   save the textual content and the current browsing state of the at least one web document of the set of web documents to a playlist on a device as a text track in the web document player, the playlist having a plurality of text tracks, each text track of the plurality of tracks having a title and the textual content;
   display, in response to a selection by a user to view the textual content, the textual content of the text track in the web document player;
   narrate, in response to a selection by the user to hear the textual content, synthesized speech from the textual content of the text track in the playlist from the saved browsing state, enabling seamless switching between the web browser and the audio player component and the audio player component of the web document player application playing the textual content via speech synthesis; and
   synchronize a current state of the text track with another device.

9. The system according to claim 8, further comprising instructions causing the system to convert at least a portion of text track content to audio.

10. The system according to claim 8, further comprising instructions causing the system to enable selection, by a user, of a portion of text from the set of web documents.

11. The system according to claim 8, further comprising instructions causing the system to automatically extract a portion of useful text from the set of web documents.

12. The system according to claim 8, further comprising instructions causing the system to add each of the set of web documents as a text track to one or more playlists operable via the audio player component.

13. The system according to claim 8, further comprising instructions causing the system to:
select at least one text track added to the playlist; and synthesize speech of text in the text track.

14. The system according to claim 8, further comprising instructions causing the system to display visual content of at least one web document text track.

15. The system according to claim 8, further comprising instructions causing the system to synchronize a state of the textual content of a text track of the playlist on a device with a plurality of devices.

16. A computer-readable storage device storing computer instructions, which when executed, enables a computer system to combine web browser and audio player functionality for organization and consumption of web documents, the computer instructions comprising:
   identifying a set of textual web documents via a web document player application that displays textual content of a web document, wherein the web document player application comprises a web browser for rendering the web document and an audio player component having a subcomponent configured to narrate a collection of textual documents via speech synthesis;
   capturing a current browsing state of at least one web document of the set of web documents;
   saving the textual content and the current browsing state of the at least one web document of the set of web documents to a playlist on a device as a text track in the web document player, the playlist having a plurality of text tracks, each text track of the plurality of text tracks having a title and the textual content;
   displaying, in response to a selection by a user to view the textual content, the textual content of the text track in the web document player;
   causing, in response to a selection by the user to hear the textual content, the audio player component of the web document player application to synthesize speech of the textual content from the textual content of the text track in the playlist from the saved browsing state, enabling seamless switching between the web browser and the audio player component; and
   synchronizing a current state of the text track with another device.

17. The computer-readable storage device according to claim 16 further comprising computer instructions for performing at least one of the following:
   enabling at least one of: selection, by a user, of a portion of text from the set of web documents, and automatically extracting a portion of useful text from the set of web documents.

18. The computer-readable storage device according to claim 16 further comprising computer instructions for:
   selecting at least one text track added to the playlist; and synthesizing speech of text in the text track.

19. The computer-readable storage device according to claim 16 further comprising computer instructions for displaying visual content of at least one web document text track.

* * * * *